(12) United States Patent
Shveidel et al.

(10) Patent No.: US 11,301,330 B2
(45) Date of Patent: Apr. 12, 2022

(54) SYSTEM AND METHOD FOR RESTORING METADATA PAGES

(71) Applicant: EMC IP Holding Company, LLC, Hopkinton, MA (US)

(72) Inventors: Vladimir Shveidel, Pardes-Hana (IL); Ronen Gazit, Tel Aviv (IL); Uri Shabi, Tel Mond (IL); Alex Soukhman, Raanana (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 224 days.

(21) Appl. No.: 16/262,005

(22) Filed: Jan. 30, 2019

(65) Prior Publication Data

US 2020/0241969 A1 Jul. 30, 2020

(51) Int. Cl.
*G06F 16/00* (2019.01)
*G06F 11/14* (2006.01)
*G06F 16/27* (2019.01)
*G06F 16/13* (2019.01)

(52) U.S. Cl.
CPC ...... *G06F 11/1451* (2013.01); *G06F 11/1469* (2013.01); *G06F 16/134* (2019.01); *G06F 16/27* (2019.01); *G06F 16/273* (2019.01); *G06F 2201/80* (2013.01); *G06F 2201/82* (2013.01)

(58) Field of Classification Search
CPC ... G06F 16/134; G06F 16/273; G06F 11/1461
See application file for complete search history.

(56) References Cited

U.S. PATENT DOCUMENTS

| 8,639,660 | B1* | 1/2014 | Ou | G06F 16/27 707/625 |
| 2004/0059510 | A1* | 3/2004 | Thompson, Jr. | G06Q 10/06 702/6 |
| 2008/0119177 | A1* | 5/2008 | Hovnanian | G06F 16/9577 455/414.2 |
| 2008/0222159 | A1* | 9/2008 | Aranha | G06F 16/21 |
| 2012/0290540 | A1* | 11/2012 | Walkauskas | G06F 17/30283 707/674 |
| 2016/0070480 | A1* | 3/2016 | Babu | G06F 3/0665 711/114 |

* cited by examiner

*Primary Examiner* — Ajith Jacob
(74) *Attorney, Agent, or Firm* — Brian J. Colandreo; Mark H. Whittenberger; Holland & Knight LLP

(57) ABSTRACT

A method, computer program product, and computing system for identifying one or more metadata pages stored in a storage array, thus defining a primary set of metadata pages. An alternative set of metadata pages may be generated from the primary set of metadata pages. A log of changes associated with the primary set of metadata pages may be generated. A copy of at least a portion of the primary set of metadata pages may be generated based upon, at least in part, the alternative set of metadata pages and the log of changes associated with the primary set of metadata pages. The alternative set of metadata pages may lag behind in time from the primary set of metadata pages by a predefined amount of time.

21 Claims, 12 Drawing Sheets

SYSTEM AND METHOD FOR RESTORING METADATA PAGES

BACKGROUND

Storing and safeguarding electronic content may be beneficial in modern business and elsewhere. Accordingly, various methodologies may be employed to protect and distribute such electronic content. For example, changes to data and metadata of a storage system may be stored in journals and/or logs in memory before writing the changes to a storage array.

Most conventional storage clusters or storage systems have data protection and recovery mechanisms for responding to different types of failures. However most known techniques (e.g., RAID and/or Journaling) generally do not protect data from corruptions caused by software bugs and sporadic non-fatal hardware failure. The problem is even more critical when the corrupted data is a metadata page, since in this case, the corruption of a metadata page may lead to multiple data corruptions from a client's perspective and even total data loss.

SUMMARY OF DISCLOSURE

In one example implementation, a computer-implemented method executed on a computing device may include but is not limited to identifying one or more metadata pages stored in a storage array, thus defining a primary set of metadata pages. An alternative set of metadata pages may be generated from the primary set of metadata pages. A log of changes associated with the primary set of metadata pages may be generated. A copy of at least a portion of the primary set of metadata pages may be generated based upon, at least in part, the alternative set of metadata pages and the log of changes associated with the primary set of metadata pages.

One or more of the following example features may be included. At least one metadata page may be read from the alternative set of metadata pages. One or more changes associated with the at least one metadata page may be identified from the log of changes associated with the primary set of metadata pages. The identified one or more changes to the at least one metadata page read from the alternative set of metadata pages may be merged. The at least a portion of the primary set of metadata pages may be restored from the generated copy of the at least a portion of the primary set of metadata pages. Restoring the at least a portion of the primary set of metadata pages from the generated copy of the at least a portion of the primary set of metadata pages may be in response to detecting corruption of the at least a portion of the primary set of metadata pages. The alternative set of metadata pages may lag behind in time from the primary set of metadata pages by a predefined amount of time. Generating the copy of the at least a portion of the primary set of metadata pages may include generating the copy of the at least a portion of the primary set of metadata pages at a predefined time interval. The log of changes associated with the primary set of metadata pages may include a plurality of tuples representative of the changes to the primary set of metadata pages.

In another example implementation, a computer program product resides on a computer readable medium that has a plurality of instructions stored on it. When executed by a processor, the instructions cause the processor to perform operations that may include but are not limited to identifying one or more metadata pages stored in a storage array, thus defining a primary set of metadata pages. An alternative set of metadata pages may be generated from the primary set of metadata pages. A log of changes associated with the primary set of metadata pages may be generated. A copy of at least a portion of the primary set of metadata pages may be generated based upon, at least in part, the alternative set of metadata pages and the log of changes associated with the primary set of metadata pages.

One or more of the following example features may be included. At least one metadata page may be read from the alternative set of metadata pages. One or more changes associated with the at least one metadata page may be identified from the log of changes associated with the primary set of metadata pages. The identified one or more changes to the at least one metadata page read from the alternative set of metadata pages may be merged. The at least a portion of the primary set of metadata pages may be restored from the generated copy of the at least a portion of the primary set of metadata pages. Restoring the at least a portion of the primary set of metadata pages from the generated copy of the at least a portion of the primary set of metadata pages may be in response to detecting corruption of the at least a portion of the primary set of metadata pages. The alternative set of metadata pages may lag behind in time from the primary set of metadata pages by a predefined amount of time. Generating the copy of the at least a portion of the primary set of metadata pages may include generating the copy of the at least a portion of the primary set of metadata pages at a predefined time interval. The log of changes associated with the primary set of metadata pages may include a plurality of tuples representative of the changes to the primary set of metadata pages.

In another example implementation, a computing system includes at least one processor and at least one memory architecture coupled with the at least one processor, wherein the computing system is configured to perform operations that may include but are not limited to identifying one or more metadata pages stored in a storage array, thus defining a primary set of metadata pages. An alternative set of metadata pages may be generated from the primary set of metadata pages. A log of changes associated with the primary set of metadata pages may be generated. A copy of at least a portion of the primary set of metadata pages may be generated based upon, at least in part, the alternative set of metadata pages and the log of changes associated with the primary set of metadata pages.

One or more of the following example features may be included. At least one metadata page may be read from the alternative set of metadata pages. One or more changes associated with the at least one metadata page may be identified from the log of changes associated with the primary set of metadata pages. The identified one or more changes to the at least one metadata page read from the alternative set of metadata pages may be merged. The at least a portion of the primary set of metadata pages may be restored from the generated copy of the at least a portion of the primary set of metadata pages. Restoring the at least a portion of the primary set of metadata pages from the generated copy of the at least a portion of the primary set of metadata pages may be in response to detecting corruption of the at least a portion of the primary set of metadata pages. The alternative set of metadata pages may lag behind in time from the primary set of metadata pages by a predefined amount of time. Generating the copy of the at least a portion of the primary set of metadata pages may include generating the copy of the at least a portion of the primary set of metadata pages at a predefined time interval. The log of changes associated with the primary set of metadata pages may include a plurality of tuples representative of the changes to the primary set of metadata pages.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
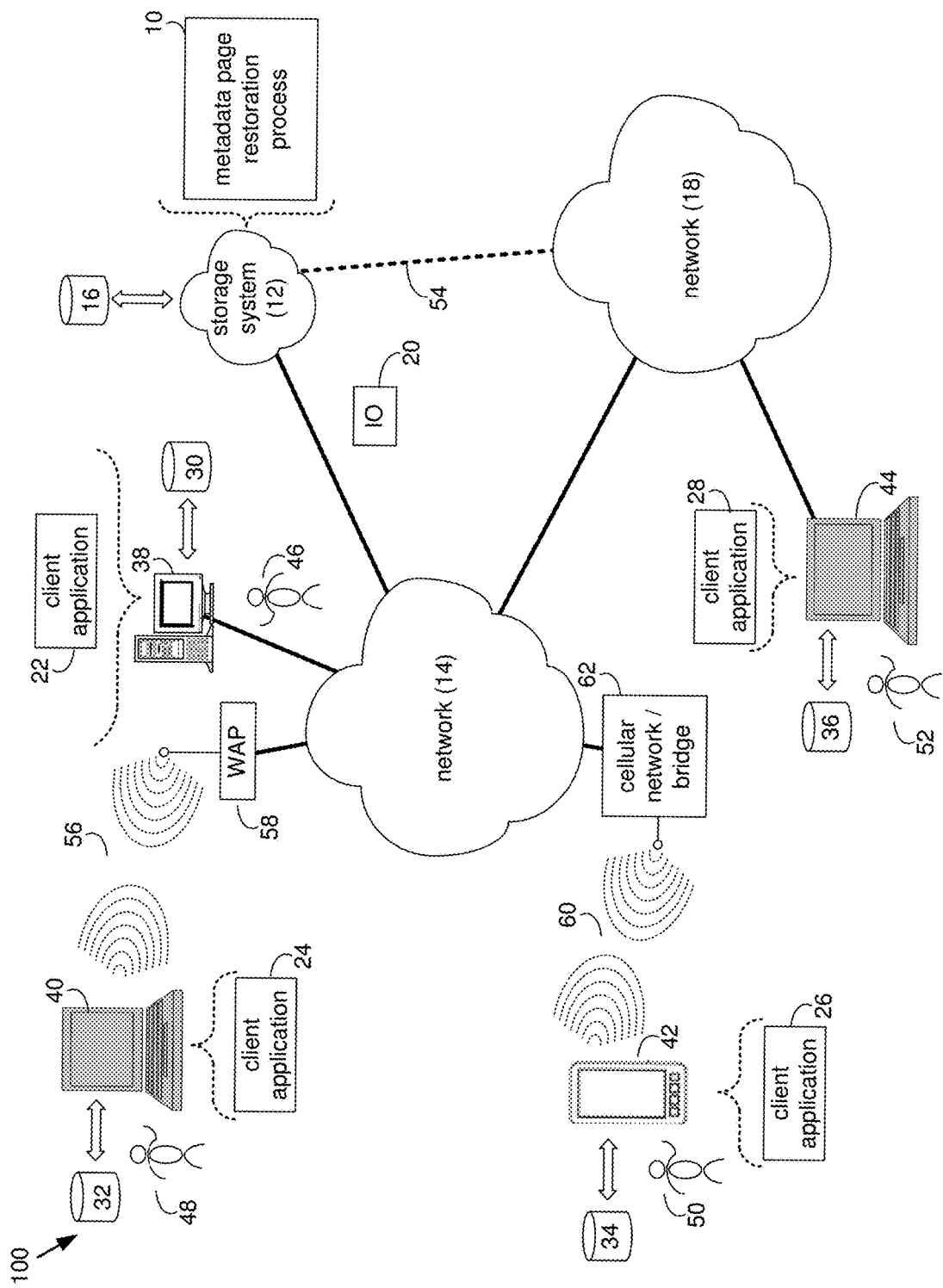
FIG. 1 is an example diagrammatic view of a storage system and a metadata page restoration process coupled to a distributed computing network according to one or more example implementations of the disclosure.

System Overview:

Referring to FIG. 1, there is shown metadata page restoration process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata page restoration process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of metadata page restoration process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as metadata page restoration process 10 of FIG. 1, may include but is not limited to, identifying one or more metadata pages stored in a storage array, thus defining a primary set of metadata pages. An alternative set of metadata pages may be generated from the primary set of metadata pages. A log of changes associated with the primary set of metadata pages may be generated. A copy of at least a portion of the primary set of metadata pages may be generated based upon, at least in part, the alternative set of metadata pages and the log of changes associated with the primary set of metadata pages.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
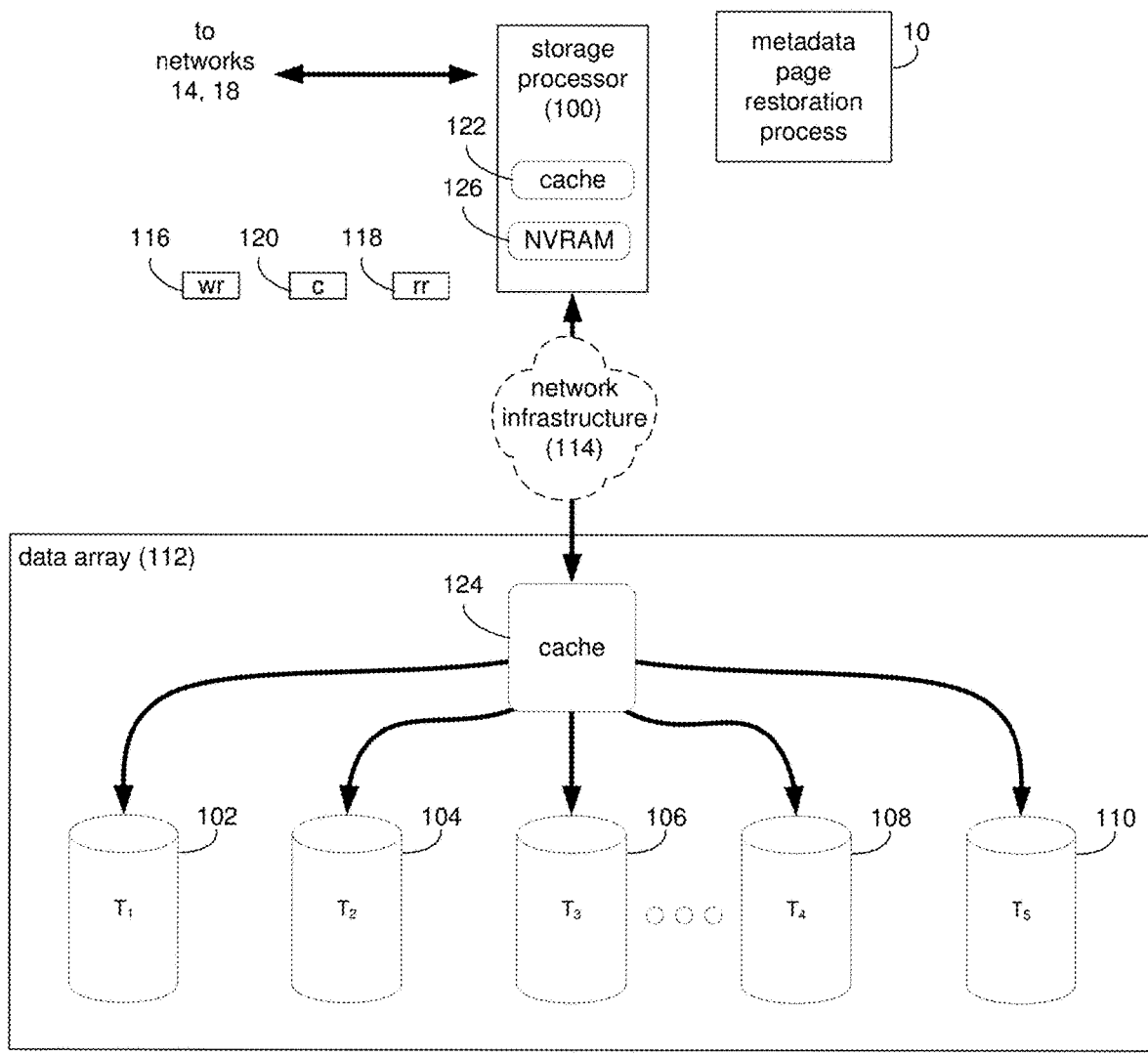
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata page restoration process 10. The instruction sets and subroutines of metadata page restoration process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of metadata page restoration process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of metadata page restoration process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata page restoration process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As will be discussed in greater detail below and in some implementations, storage processor 100 may include non-volatile Random Access Memory (NVRAM) for storing content.

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
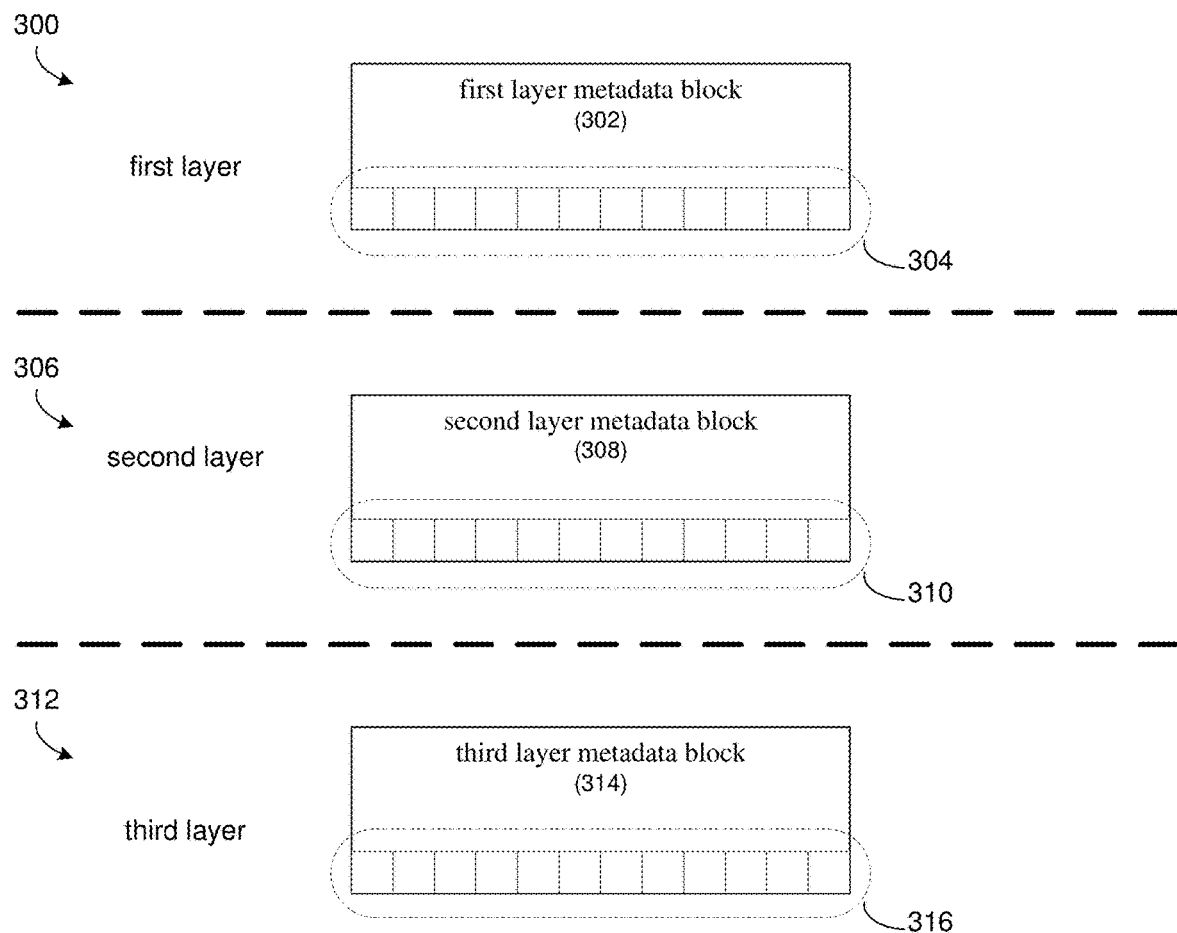
Figure 4:
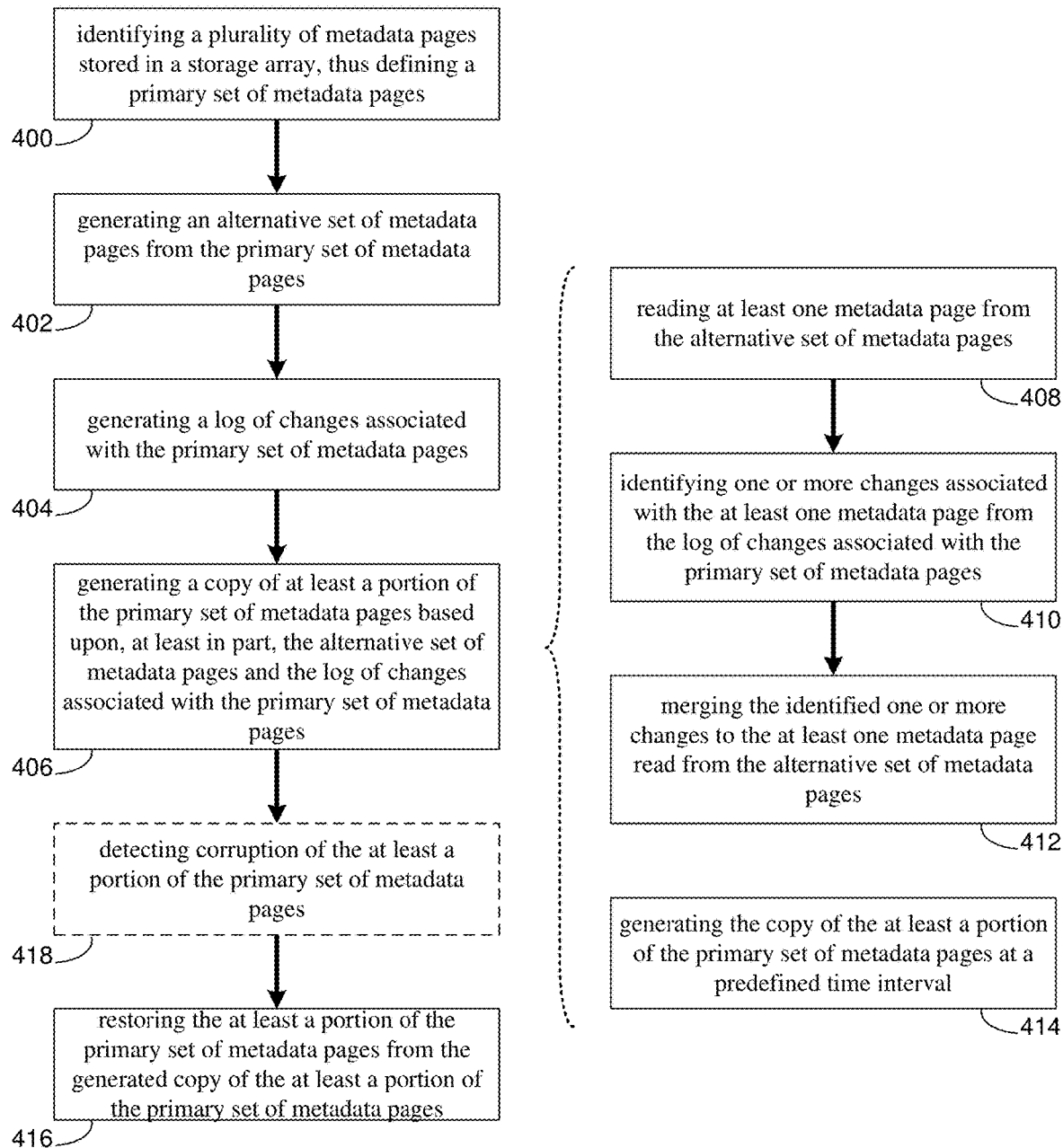
FIG. 4 is an example flowchart of the metadata page restoration process of FIG. 1 according to one or more example implementations of the disclosure.

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one.

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may also be referred to as a metadata page and may have a predefined amount of storage capacity (e.g., 4 kilobytes) for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

The Lagging Metadata Storage Process:

Referring also to FIGS. 4-12 and in some implementations, metadata page restoration process 10 may identify 400 a plurality of metadata pages stored in a storage array, thus defining a primary set of metadata pages. An alternative set of metadata pages may be generated 402 from the primary set of metadata pages. A log of changes associated with the primary set of metadata pages may be generated 404. A copy of at least a portion of the primary set of metadata pages may be generated 406 based upon, at least in part, the alternative set of metadata pages and the log of changes associated with the primary set of metadata pages.

As will be discussed in greater detail below, embodiments of the present disclosure may provide a lagging metadata storage system and method. Most conventional storage clusters or storage systems have data protection and recovery mechanisms for responding to different types of failures. However most known techniques (e.g., RAID and/or Journaling) generally do not protect data from corruptions caused by software bugs and sporadic non-fatal hardware failure. Examples of these kind of failures generally include a memory overrun, the writing of a valid data page to the wrong location, data page corruption, etc. In the case of a memory overrun (i.e., when some data page ready is overrun because of software bug before it is committed to persistent storage), garbage will be persisted instead of a correct data page. Any RAID redundancy cannot help in this example, since all RAID copies will contain the same garbage. In each of these cases, classical RAID or Journal protection is insufficient. The problem is even more critical when the corrupted data is a metadata page, since in this case, the corruption of a metadata page may lead to multiple data corruptions from a client's perspective and even total data loss. To address the problem above a lagging copy of a primary set of metadata pages may be generated for storage inline recovery after corruptions.

Figure 5:
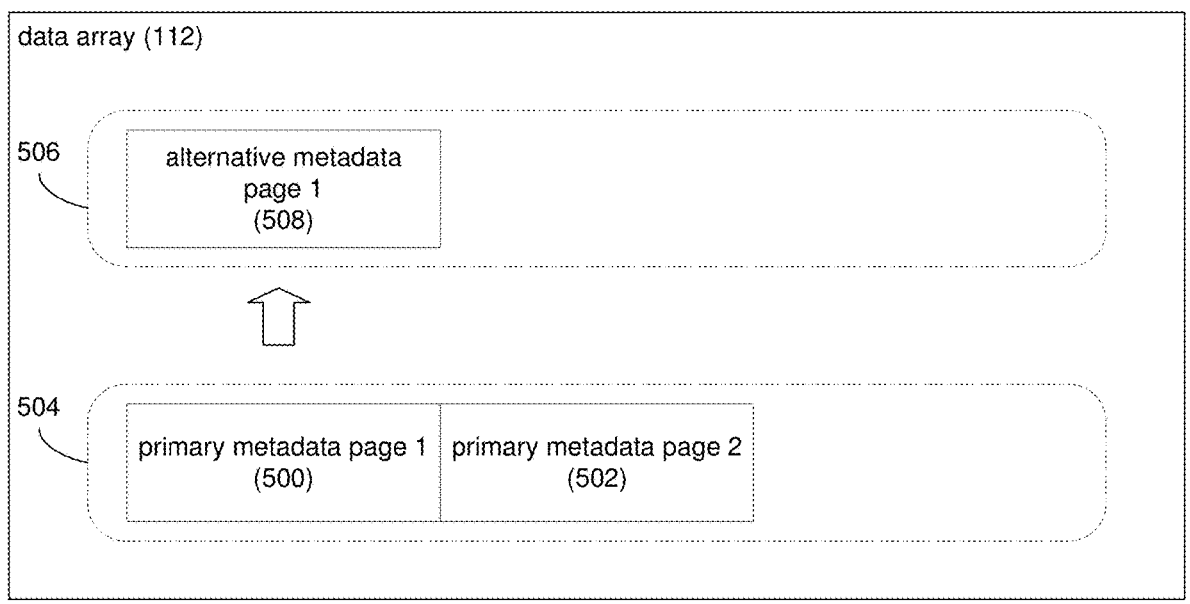
FIGS. 5-12 are example diagrammatic views of the metadata page restoration process of FIG. 1 according to one or more example implementations of the disclosure.

In some implementations, metadata page restoration process 10 may identify 400 one or more metadata pages stored in a storage array, thus defining a primary set of metadata pages. Referring to the example of FIG. 5 and in some implementations, metadata page restoration process 10 may identify 400 one or more metadata pages (e.g., primary metadata page 1 500 and primary metadata page 2 502) stored in a storage array (e.g., data array 112). In some implementations, the identified metadata page(s) may define a primary set of metadata pages (e.g., primary set of metadata pages 504). While FIG. 5 shows a single metadata page, it will be appreciated that any number of metadata pages may be identified within the scope of the present disclosure.

In some implementations, metadata page restoration process 10 may generate 402 an alternative set of metadata pages from the primary set of metadata pages. Referring again to at least the example of FIG. 5 and in some implementations, metadata page restoration process 10 may generate 402 an alternative set of metadata pages (e.g., alternative set of metadata pages 506). In some implementations, metadata page restoration process 10 may generate a copy of the primary set of metadata pages (e.g., primary set of metadata pages 504). In this example and as will be discussed in greater detail below, metadata page restoration process 10 may generate alternative metadata page 1 508 for alternative set of metadata pages 506.

In some implementations, the alternative set of metadata pages may lag behind in time from the primary set of metadata pages by a predefined amount of time. For example, suppose that e.g., one hour ago, the primary set of metadata pages (e.g., primary set of metadata pages 504) included only a single primary metadata page (e.g., primary metadata page 1 500). Now suppose that e.g., 30 minutes ago, the primary set of metadata pages (e.g., primary set of metadata pages 504) is updated with a new metadata page (e.g., primary metadata page 2 502). In some implementations, metadata page restoration process 10 may define (e.g., as a default and/or as a user-defined value) a predefined amount of time by which the alternative set of metadata is to lag behind the primary set of metadata. In some implementations, metadata page restoration process 10 may generate the alternative set of metadata pages based on the condition of the primary set of metadata pages at the predefined amount of time in the past.

Continuing with the above example, suppose that the predefined amount of time is e.g., one hour. Metadata page restoration process 10 may generate the alternative set of metadata pages based on the condition of the primary set of metadata pages from the predefined amount of time (e.g., one hour) in the past. Accordingly, when the alternative set of metadata pages is generated 402 in this example, the alternative set of metadata pages will include a copy of primary metadata page 1 500 (e.g., alternative metadata page 1 508) but will not include a copy of primary metadata page 2 502 because as of the predefined amount of time previous to the time when the alternative set of metadata was generated (e.g., one hour ago), the primary set of metadata pages (e.g., primary set of metadata pages 504) did not include primary metadata page 502. Accordingly, metadata page restoration process 10 may generate 402 alternative set of metadata 506 to include alternative metadata page 1 508 (which is a copy of primary metadata page 1 500 as of the predefined amount of time in the past).

For example, suppose that at some point in time after the primary set of metadata pages is updated with the new metadata page, the primary set of metadata pages becomes corrupted. In this example and as will be discussed in greater detail below, because the alternative set of metadata pages was not updated to include the new metadata page, metadata page restoration process 10 may restore at least a portion of the primary set of metadata pages using at least the alternative set of metadata pages.

In some implementations, metadata page restoration process 10 may generate 404 a log of changes associated with the primary set of metadata pages. In some implementations, the log of changes associated with the primary set of metadata pages may include a plurality of tuples representative of the changes to the primary set of metadata pages. In some implementations, the one or more metadata changes or deltas may be received or converted (e.g., by the storage processor) into a metadata update tuple. In some implementations, the metadata update tuple may include various entries including, but not limited to, a logical index of a metadata page, an entry index referring to a specific entry or offset inside the metadata page, a record or delta type that defines the size of the delta, the payload or new value of the entry in the metadata page, etc. It will be appreciated that other information associated with a metadata change or delta may be defined in a metadata update tuple.

Figure 6:
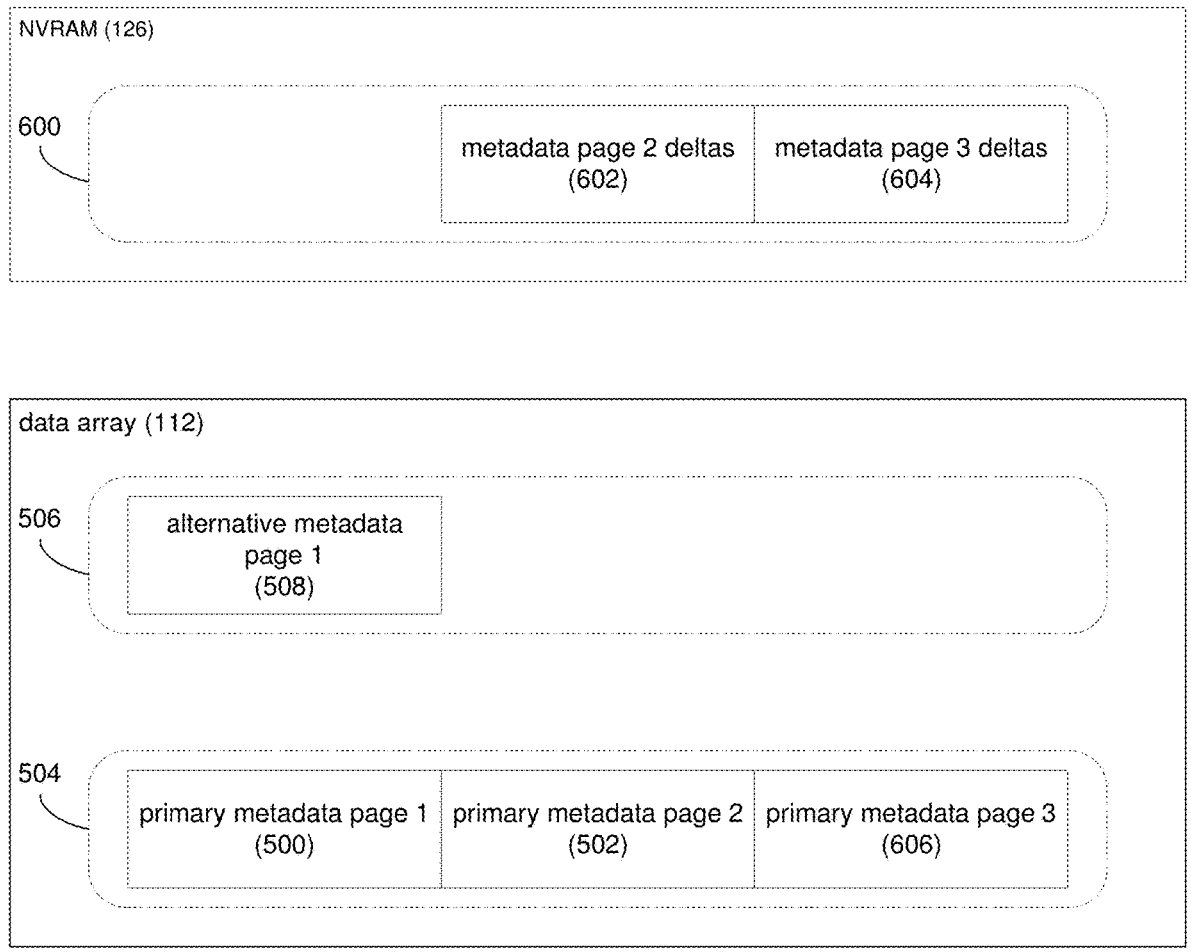
Figure 7:
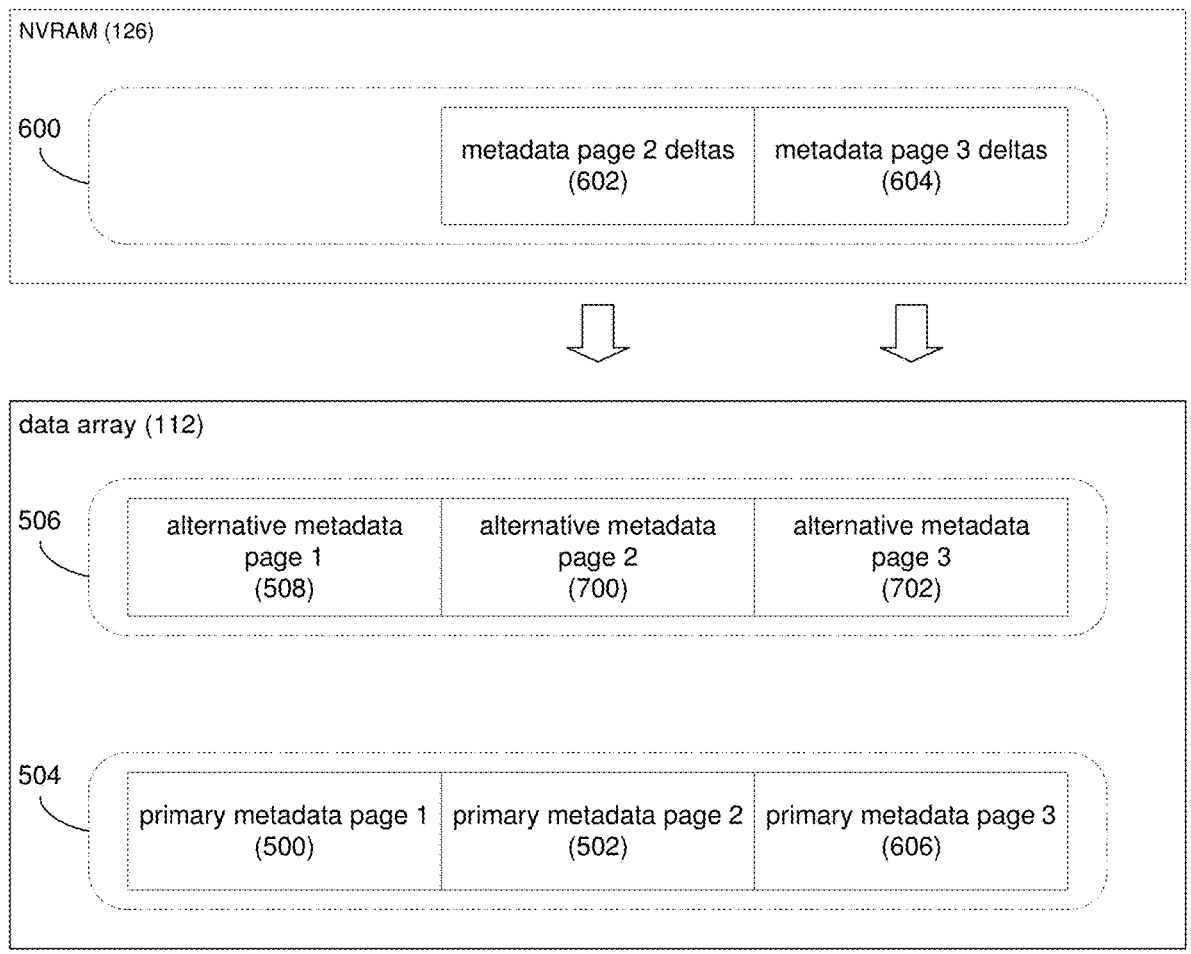
Figure 8:
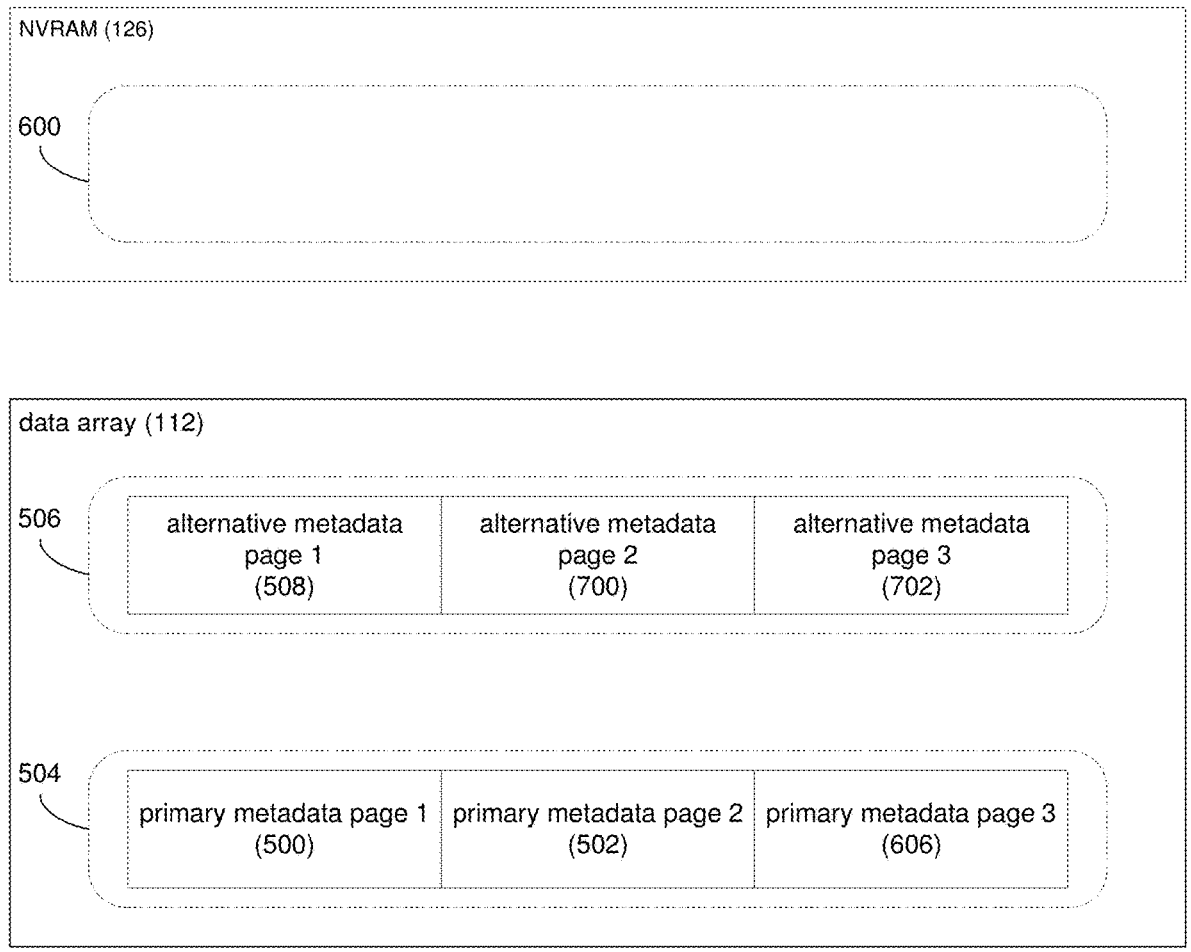
Figure 9:
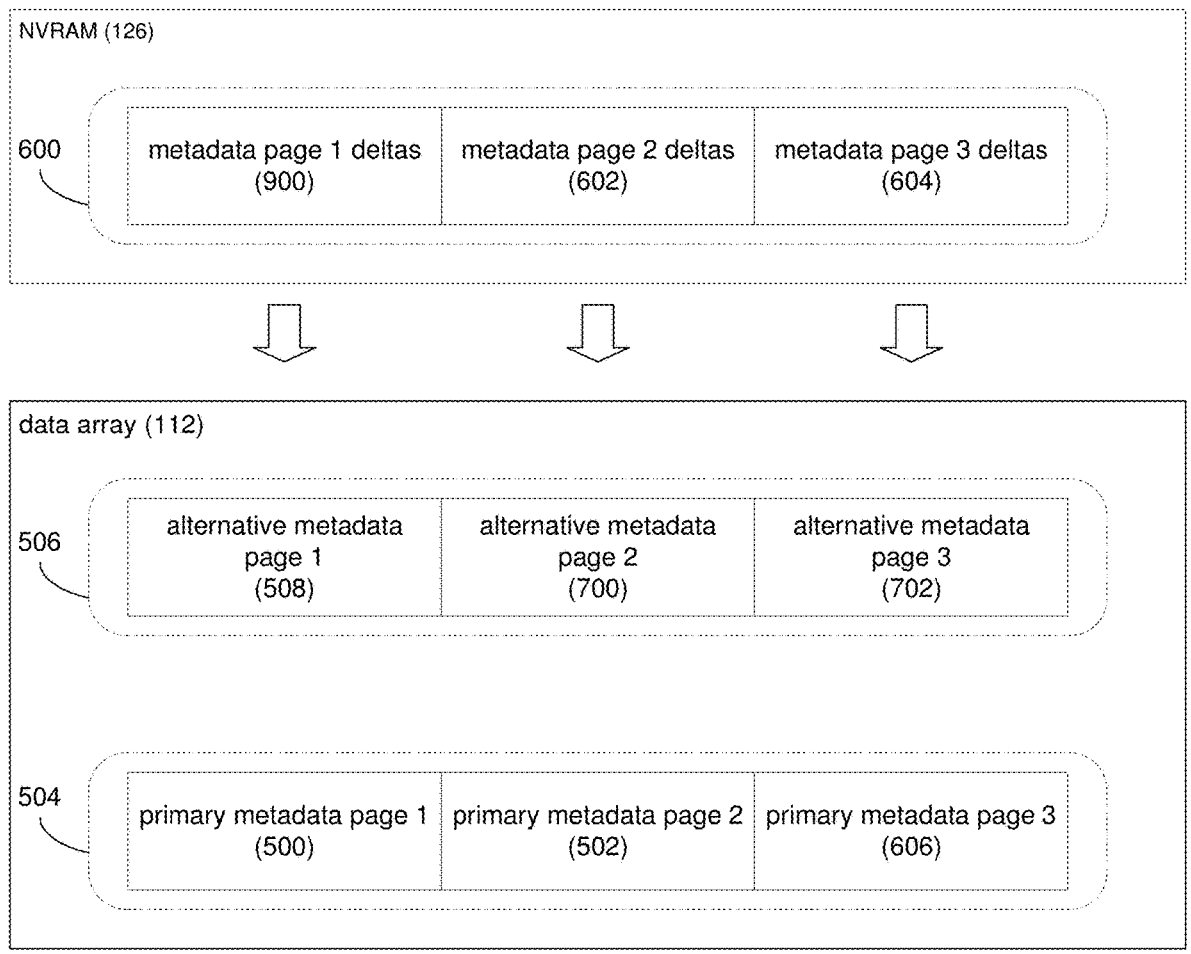
Figure 10:
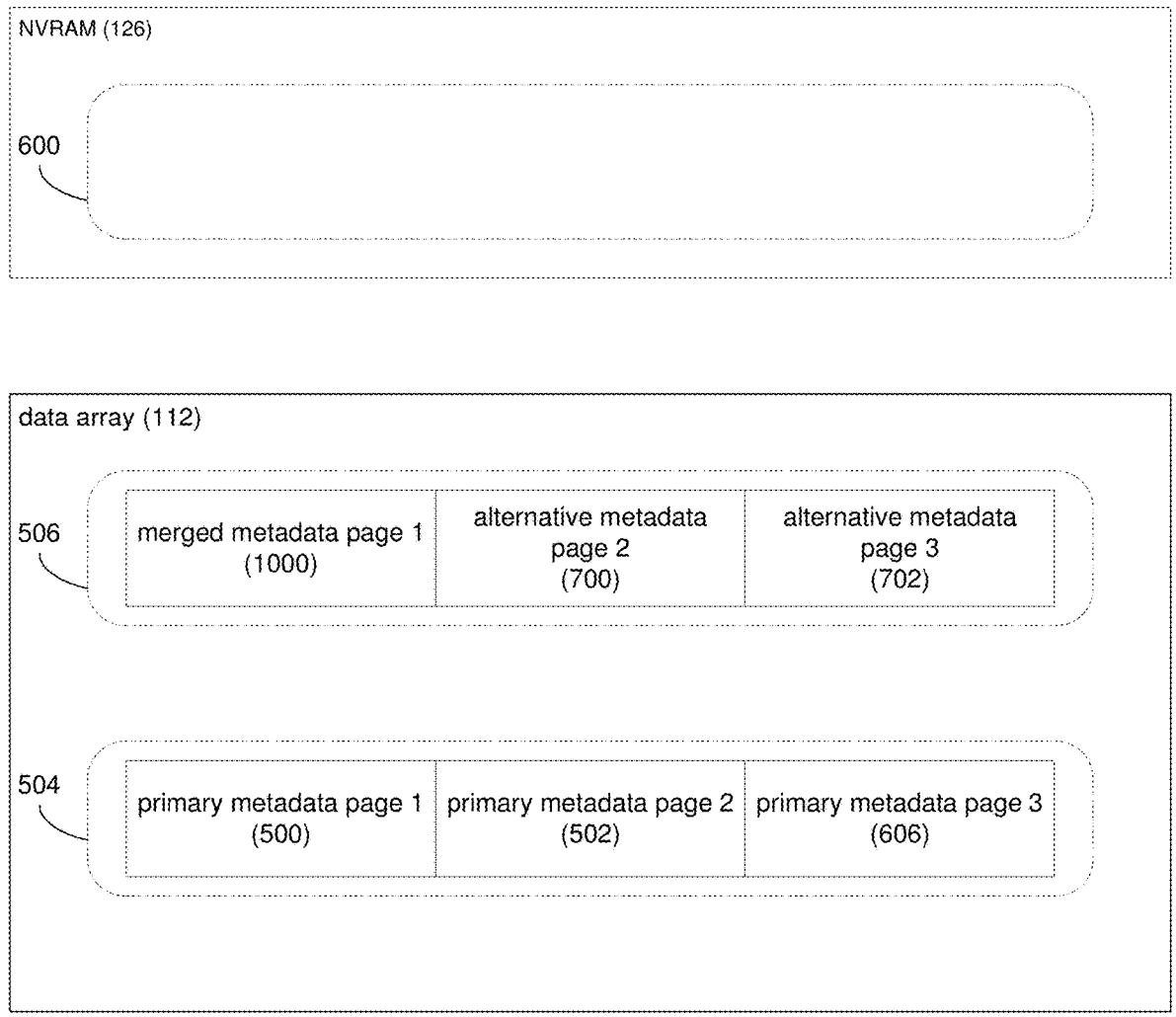

Referring also to the example of FIG. 6 and in some implementations, metadata page restoration process 10 may generate 404 a log of changes (e.g., metadata change log 600) associated with the primary set of metadata pages. In some implementations, the log of changes (e.g., metadata change log 600) may be stored in non-volatile Random Access Memory (NVRAM) (e.g., NVRAM 126). In some implementations, the log of changes may be stored in the persistent storage of the storage array (e.g., data array 112). In some implementations, the log of changes associated with the primary set of metadata pages (e.g., metadata change log 600) may be updated with metadata update tuples indicating changes to or deltas of the primary set of metadata pages (e.g., primary set of metadata pages 504). For example, suppose that after generating 502 the alternative set of metadata pages (e.g., alternative set of metadata pages 506), metadata page restoration process 10 receives deltas (e.g., metadata page 2 deltas 602, metadata page 3 deltas 604) associated with primary metadata page 2 502 and primary metadata page 3 606. These deltas may be stored in the log of changes (e.g., metadata change log 600). As will be discussed in greater detail below, metadata page restoration process 10 may use the combination of the set of alternative metadata pages (e.g., set of alternative metadata pages 506) and the log of metadata changes associated with the primary set of metadata pages (e.g., metadata change log 600) to generate a copy of a least a portion of the primary set of metadata pages.

In some implementations, metadata page restoration process 10 may generate 406 a copy of at least a portion of the primary set of metadata pages based upon, at least in part, the alternative set of metadata pages and the log of changes associated with the primary set of metadata pages. Referring also to the example of FIG. 7 and in some implementations, metadata page restoration process 10 may generate 406 a copy of at least a portion of the primary set of metadata pages (e.g., primary set of metadata pages 504) by merging or replaying the entries of the log of changes associated with the primary set of metadata pages (e.g., metadata change log 600) to the alternative set of metadata pages (e.g., alternative set of metadata pages 506). Continuing with the example of FIG. 6, the log of changes associated with the primary set of metadata pages (e.g., metadata change log 600) may receive deltas (e.g., metadata page 2 deltas 602, metadata page 3 deltas 604) associated with primary metadata page 2 502 and primary metadata page 3 606 of primary set of metadata pages 504. In this example, the deltas (e.g., metadata page 2 deltas 602, metadata page 3 deltas 604) of the log of changes associated with the primary set of metadata pages (e.g., metadata change log 600) may be merged with the alternative metadata page 1 508 of alternative set of metadata pages 506. In this manner, a copy of the primary set of metadata pages may be generated 406 in the form of alternative metadata page 1 508, alternative metadata page 2 700, and alternative metadata page 3 702. Accordingly, the alternative set of metadata pages (e.g., alternative set of metadata pages 506) may define a copy of the primary set of metadata pages. Referring also to the example of FIG. 8 and in some implementations, metadata page restoration process 10 may clear or free up at least a portion of the log of changes associated with the primary set of metadata pages (e.g., metadata change log 600) in response to generating 406 the copy of the at least a portion of the primary set of metadata pages. Returning to the above example and in some implementations, metadata page restoration process 10 may clear metadata page 2 deltas 602 and metadata page 3 deltas 604 from metadata change log 600 in response to generating 406 the copy of the at least a portion of the primary set of metadata pages.

In some implementations, generating 406 the copy of the at least a portion of the primary set of metadata pages may include generating 414 the copy of the at least a portion of the primary set of metadata pages at a predefined time interval. In some implementations, metadata page restoration process 10 may generate 414 the copy of the at least a portion of the primary set of metadata pages at a predefined time interval (e.g., every thirty minutes, every hour, every day, etc.). In some implementations, the predefined time interval may be a default time interval and/or may be a user-defined predefined time interval. It will be appreciated that any predefined time interval may be utilized within the scope of the present disclosure.

In some implementations, metadata page restoration process 10 may merge the deltas of the log of changes associated with the primary set of metadata pages with existing metadata pages in the alternative set of metadata pages. For example and in some implementations, generating 406 the copy of the at least a portion of the primary set of metadata pages may include reading 408 at least one metadata page from the alternative set of metadata pages. Referring also to the example of FIG. 9 and in some implementations, metadata page restoration process 10 may read alternative metadata page 1 508 from alternative set of metadata pages 506.

In some implementations, metadata page restoration process 10 may identify 410 one or more changes associated with the at least one metadata page from the log of changes associated with the primary set of metadata pages. For example, metadata page restoration process 10 may identify 410 metadata page 1 deltas 900 associated with metadata page 1 from metadata change log 600.

In some implementations, metadata page restoration process 10 may merge 412 the identified one or more changes to the at least one metadata page read from the alternative set of metadata pages. For example and referring also to FIG. 10, metadata page restoration process 10 may merge 412 the identified one or more changes (e.g., metadata page 1 deltas 900) to alternative metadata page 1 508 read from the alternative set of metadata pages to form merged metadata page 1 1000. As discussed above and in some implementations, metadata page restoration process 10 may clear or free up at least a portion of the log of changes associated with the primary set of metadata pages (e.g., metadata change log 600) in response to generating 406 the copy of the at least a portion of the primary set of metadata pages. Returning to the above example and in some implementations, metadata page restoration process 10 may clear metadata page 1 deltas 900, metadata page 2 deltas 602, and metadata page 3 deltas 604 from metadata change log 600 in response to generating 406 the copy of the at least a portion of the primary set of metadata pages.

Figure 11:
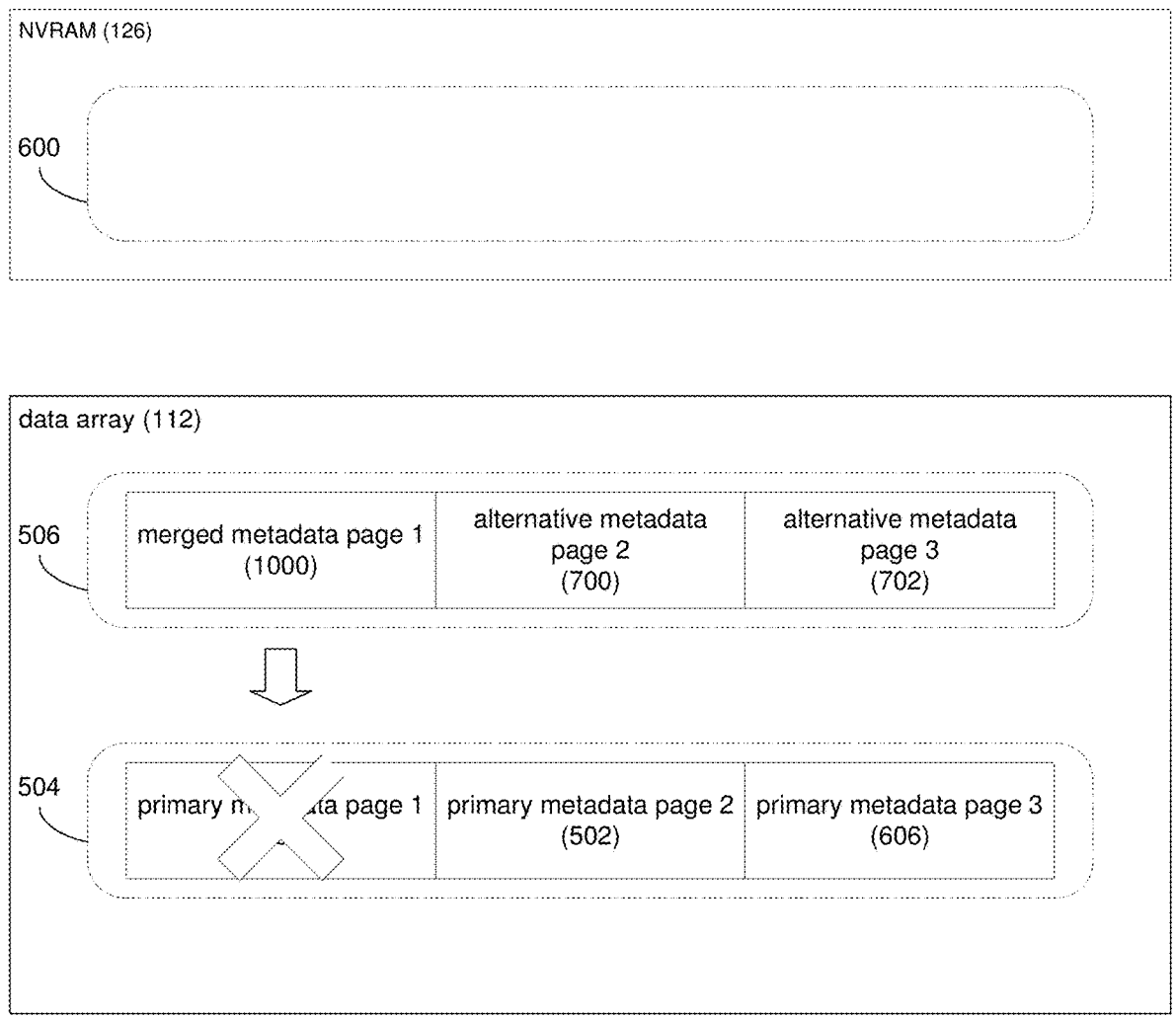
Figure 12:
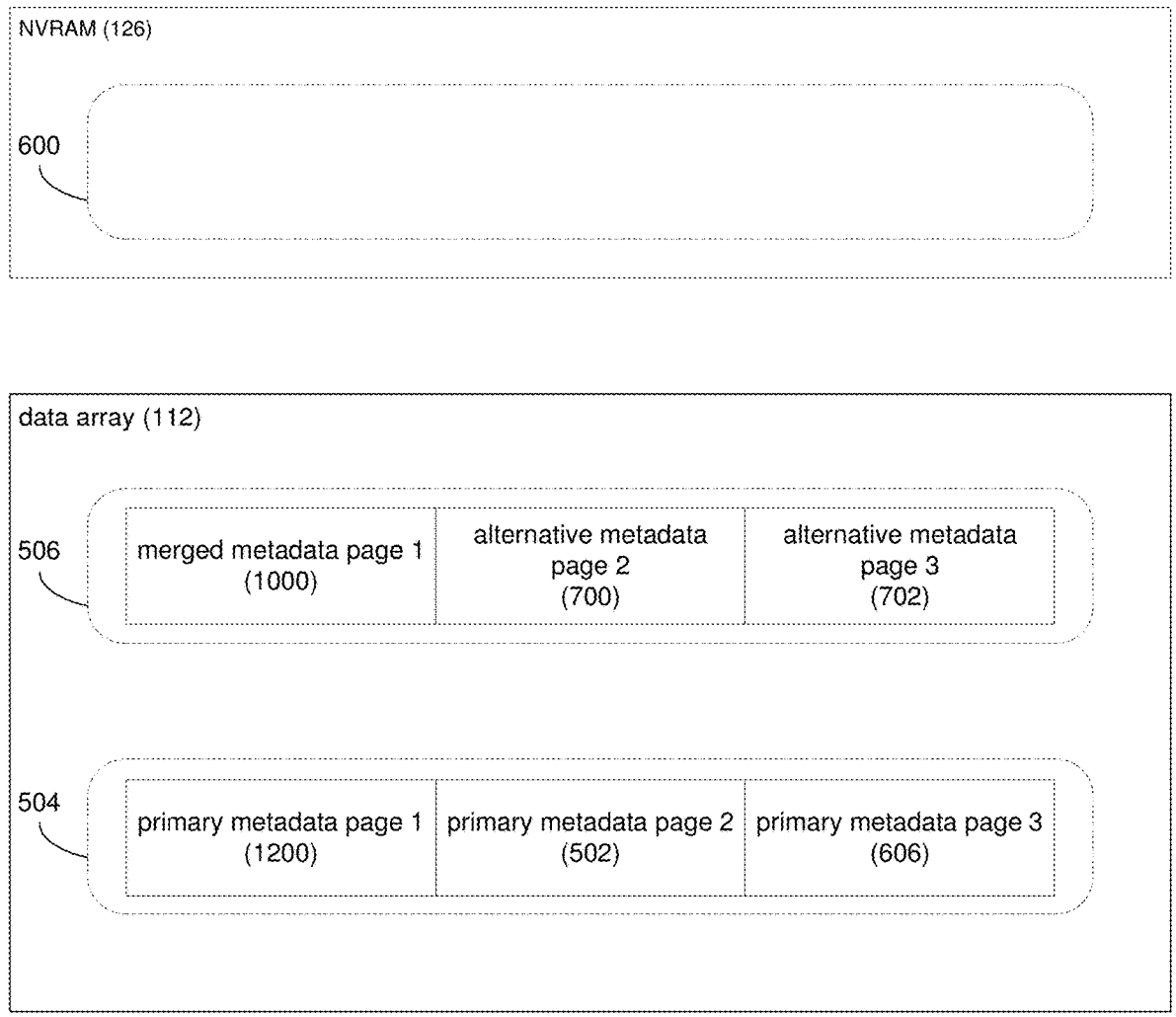

In some implementations, metadata page restoration process 10 may restore 416 the at least a portion of the primary set of metadata pages from the generated copy of the at least a portion of the primary set of metadata pages. As discussed above and in some implementations, metadata page restoration process 10 may provide a copy of the primary set of metadata pages for restoring or recovering the primary set of metadata pages. In some implementations, restoring 416 the at least a portion of the primary set of metadata pages from the generated copy of the at least a portion of the primary set of metadata pages may be in response to detecting 418 corruption of the at least a portion of the primary set of metadata pages. Referring also to the examples of FIGS. 11-12 and in some implementations, metadata page restoration process 10 may detect 418 that at least a portion of the primary set of metadata pages is corrupted. In the example of FIG. 11, metadata page restoration process 10 may detect 418 that primary metadata page 1 500 is corrupted. In this example, metadata page restoration process 10 may restore 416 primary metadata page 1 500 using the copy of the primary set of metadata pages generated 406. Referring again to at least FIG. 10, metadata page restoration process 10 may generate merged metadata page 1 1000 as a combination of a previous iteration of primary metadata page 1 500 (e.g., as alternative metadata page 1 508) and metadata page 1 deltas 900 from metadata change log 600. In this manner, metadata page restoration process 10 may restore primary metadata page 1 500 as primary metadata page 1200 from the merged metadata page 1 1000 from the copy of the primary set of metadata pages generated 406 by metadata page restoration process 10. While an example of restoring a single metadata page has been provided, it will be appreciated that any number of metadata pages may be restored within the scope of the present disclosure.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
creating a multi-layer metadata architecture for one or more metadata pages stored in a storage array, wherein the multi-layer metadata architecture comprises
a first layer, wherein the first layer includes one or more first layer metadata blocks,
a second layer, wherein the second layer includes one or more second layer metadata blocks and is configured to isolate a logical address of a metadata block from a physical location of a metadata block by mapping a logical block address (LBA) of one or more first layer metadata blocks included in the first layer to one or more second layer metadata blocks in the second layer and is configured to allow for user data associated with a second layer metadata block to be relocated without updating the first layer metadata blocks, and
a third layer, wherein the third layer includes one or more third layer metadata blocks, wherein one or more second layer metadata blocks are mapped to the one or more third layer metadata blocks, wherein the one or more third layer metadata blocks are configured to store user data and describe a physical location of the user data;
identifying, via the computing device, one or more metadata pages comprised of one or more third layer metadata blocks, wherein the one or more metadata pages are stored in a storage array, thus defining a primary set of metadata pages;
generating an alternative set of metadata pages from the primary set of metadata pages;
generating a log of changes associated with the primary set of metadata pages;
generating a copy of at least a portion of the primary set of metadata pages based upon, at least in part, the alternative set of metadata pages and the log of changes associated with the primary set of metadata pages; and
clearing, in response to generating the copy of at least a portion of the primary set of metadata pages based upon, at least in part, the alternative set of metadata pages and the log of changes associated with the primary set of metadata pages, at least a portion of the log of changes associated with the primary set of metadata pages from the log of changes.

2. The computer-implemented method of claim 1, wherein the alternative set of metadata pages lags behind in time from the primary set of metadata pages by a predefined amount of time.

3. The computer implemented method of claim 1, wherein generating the copy of the at least a portion of the primary set of metadata pages includes:
reading at least one metadata page from the alternative set of metadata pages;
identifying one or more changes associated with the at least one metadata page from the log of changes associated with the primary set of metadata pages; and
merging the identified one or more changes to the at least one metadata page read from the alternative set of metadata pages.

4. The computer implemented method of claim 1, further comprising:
restoring the at least a portion of the primary set of metadata pages from the generated copy of the at least a portion of the primary set of metadata pages.

5. The computer-implemented method of claim 4, wherein restoring the at least a portion of the primary set of metadata pages from the generated copy of the at least a portion of the primary set of metadata pages is in response to detecting corruption of the at least a portion of the primary set of metadata pages.

6. The computer-implemented method of claim 1, wherein generating the copy of the at least a portion of the primary set of metadata pages includes generating the copy of the at least a portion of the primary set of metadata pages at a predefined time interval.

7. The computer-implemented method of claim 1, wherein the log of changes associated with the primary set of metadata pages includes a plurality of tuples representative of the changes to the primary set of metadata pages.

8. A computer program product residing on a non-transitory computer readable medium having a plurality of instructions stored thereon which, when executed by a processor, cause the processor to perform operations comprising:
creating a multi-layer metadata architecture for one or more metadata pages stored in a storage array, wherein the multi-layer metadata architecture comprises
a first layer, wherein the first layer includes one or more first layer metadata blocks,
a second layer, wherein the second layer includes one or more second layer metadata blocks and is configured to isolate a logical address of a metadata block from a physical location of a metadata block by mapping a logical block address (LBA) of one or more first layer metadata blocks included in the first layer to one or more second layer metadata blocks in the second layer and is configured to allow for user data associated with a second layer metadata block to be relocated without updating the first layer metadata blocks, and
a third layer, wherein the third layer includes one or more third layer metadata blocks, wherein one or more second layer metadata blocks are mapped to the one or more third layer metadata blocks, wherein the one or more third layer metadata blocks are configured to store user data and describe a physical location of the user data;
identifying, via the computing device, one or more metadata pages comprised of one or more third layer metadata blocks, wherein the one or more metadata pages are stored in a storage array, thus defining a primary set of metadata pages;

generating an alternative set of metadata pages from the primary set of metadata pages;

generating a log of changes associated with the primary set of metadata pages;

generating a copy of at least a portion of the primary set of metadata pages based upon, at least in part, the alternative set of metadata pages and the log of changes associated with the primary set of metadata pages; and clearing, in response to generating the copy of at least a portion of the primary set of metadata pages based upon, at least in part, the alternative set of metadata pages and the log of changes associated with the primary set of metadata pages, at least a portion of the log of changes associated with the primary set of metadata pages from the log of changes.

9. The computer program product of claim 8, wherein the alternative set of metadata pages lags behind in time from the primary set of metadata pages by a predefined amount of time.

10. The computer program product of claim 8, wherein generating the copy of the at least a portion of the primary set of metadata pages includes:

reading at least one metadata page from the alternative set of metadata pages;

identifying one or more changes associated with the at least one metadata page from the log of changes associated with the primary set of metadata pages; and merging the identified one or more changes to the at least one metadata page read from the alternative set of metadata pages.

11. The computer program product of claim 8, further comprising:

restoring the at least a portion of the primary set of metadata pages from the generated copy of the at least a portion of the primary set of metadata pages.

12. The computer program product of claim 11, wherein restoring the at least a portion of the primary set of metadata pages from the generated copy of the at least a portion of the primary set of metadata pages is in response to detecting corruption of the at least a portion of the primary set of metadata pages.

13. The computer program product of claim 8, wherein generating the copy of the at least a portion of the primary set of metadata pages includes generating the copy of the at least a portion of the primary set of metadata pages at a predefined time interval.

14. The computer program product of claim 8, wherein the log of changes associated with the primary set of metadata pages includes a plurality of tuples representative of the changes to the primary set of metadata pages.

15. A computing system including a processor and memory configured to perform operations comprising:

creating a multi-layer metadata architecture for one or more metadata pages stored in a storage array, wherein the multi-layer metadata architecture comprises a first layer, wherein the first layer includes one or more first layer metadata blocks, a second layer, wherein the second layer includes one or more second layer metadata blocks and is configured to isolate a logical address of a metadata block from a physical location of a metadata block by mapping a logical block address (LBA) of one or more first layer metadata blocks included in the first layer to one or more second layer metadata blocks in the second layer and is configured to allow for user data associated with a second layer metadata block to be relocated without updating the first layer metadata blocks, and a third layer, wherein the third layer includes one or more third layer metadata blocks, wherein one or more second layer metadata blocks are mapped to the one or more third layer metadata blocks, wherein the one or more third layer metadata blocks are configured to store user data and describe a physical location of the user data;

identifying, via the computing device, one or more metadata pages comprised of one or more third layer metadata blocks, wherein the one or more metadata pages are stored in a storage array, thus defining a primary set of metadata pages;

generating an alternative set of metadata pages from the primary set of metadata pages;

generating a log of changes associated with the primary set of metadata pages;

generating a copy of at least a portion of the primary set of metadata pages based upon, at least in part, the alternative set of metadata pages and the log of changes associated with the primary set of metadata pages; and clearing, in response to generating the copy of at least a portion of the primary set of metadata pages based upon, at least in part, the alternative set of metadata pages and the log of changes associated with the primary set of metadata pages, at least a portion of the log of changes associated with the primary set of metadata pages from the log of changes.

16. The computing system of claim 15, wherein the alternative set of metadata pages lags behind in time from the primary set of metadata pages by a predefined amount of time.

17. The computing system of claim 15, wherein generating the copy of the at least a portion of the primary set of metadata pages includes:

reading at least one metadata page from the alternative set of metadata pages;

identifying one or more changes associated with the at least one metadata page from the log of changes associated with the primary set of metadata pages; and merging the identified one or more changes to the at least one metadata page read from the alternative set of metadata pages.

18. The computing system of claim 15, further comprising:

restoring the at least a portion of the primary set of metadata pages from the generated copy of the at least a portion of the primary set of metadata pages.

19. The computing system of claim 18, wherein restoring the at least a portion of the primary set of metadata pages from the generated copy of the at least a portion of the primary set of metadata pages is in response to detecting corruption of the at least a portion of the primary set of metadata pages.

20. The computing system of claim 15, wherein generating the copy of the at least a portion of the primary set of metadata pages includes generating the copy of the at least a portion of the primary set of metadata pages at a predefined time interval.

21. The computer-implemented method of claim 5, wherein the detected corruption includes one or more of memory overrun, writing of a valid data page to an incorrect location, and corruption of a data page.

\* \* \* \* \*